US008369548B2

(12) United States Patent
Lin

(10) Patent No.: US 8,369,548 B2
(45) Date of Patent: Feb. 5, 2013

(54) WIRELESS HEADSET DEVICE CAPABLE OF PROVIDING BALANCED STEREO AND METHOD THEREOF

(75) Inventor: Pi-Fen Lin, Taipei (TW)

(73) Assignee: Sure Best Limited, Apia (WS)

( * ) Notice: Subject to any disclaimer, the term of this patent is extended or adjusted under 35 U.S.C. 154(b) by 0 days.

(21) Appl. No.: 13/487,767

(22) Filed: Jun. 4, 2012

(65) Prior Publication Data

US 2012/0243691 A1 Sep. 27, 2012

Related U.S. Application Data

(63) Continuation-in-part of application No. 12/117,815, filed on May 9, 2008, now abandoned.

(51) Int. Cl.
*H04R 5/02* (2006.01)
*H04M 1/00* (2006.01)

(52) U.S. Cl. .................................... 381/311; 455/556.1

(58) Field of Classification Search .................. 381/311; 455/556.1

See application file for complete search history.

(56) References Cited

U.S. PATENT DOCUMENTS

| | | | | |
|---|---|---|---|---|
| 6,407,325 | B2 | 6/2002 | Yi et al. | |
| 6,608,907 | B1 | 8/2003 | Lee | |
| 7,162,240 | B2 | 1/2007 | Okazaki et al. | |
| 7,292,880 | B2 | 11/2007 | Lehtonen | |
| 7,395,090 | B2 | 7/2008 | Alden | |
| 7,616,760 | B2 | 11/2009 | Trip et al. | |
| 7,689,248 | B2 | 3/2010 | Valve et al. | |
| 7,856,240 | B2 | 12/2010 | Gunn et al. | |
| 8,064,952 | B2 * | 11/2011 | Rofougaran et al. | 455/556.1 |
| 8,068,882 | B2 * | 11/2011 | Davis et al. | 455/569.1 |
| 8,180,395 | B2 * | 5/2012 | Moran et al. | 455/556.1 |
| 2001/0027102 | A1 | 10/2001 | Okazaki et al. | |
| 2002/0018556 | A1 | 2/2002 | Okazaki et al. | |
| 2002/0065099 | A1 | 5/2002 | Bjorndahl | |
| 2004/0039464 | A1 | 2/2004 | Virolainen et al. | |
| 2005/0069161 | A1 | 3/2005 | Kaltenbach et al. | |
| 2005/0091693 | A1 | 4/2005 | Amine et al. | |
| 2005/0107029 | A1 | 5/2005 | Walker et al. | |
| 2005/0107144 | A1 | 5/2005 | Dvorak | |
| 2005/0164690 | A1 | 7/2005 | Okazaki et al. | |
| 2005/0170821 | A1 | 8/2005 | Okazaki et al. | |
| 2005/0254661 | A1 | 11/2005 | Castaneda et al. | |
| 2006/0165243 | A1 | 7/2006 | Lee | |
| 2006/0229108 | A1 * | 10/2006 | Cehelnik | 455/569.1 |
| 2007/0025579 | A1 | 2/2007 | Kolton | |
| 2007/0076908 | A1 | 4/2007 | Castaneda et al. | |

FOREIGN PATENT DOCUMENTS

| | | |
|---|---|---|
| TW | M299999 | 10/2006 |

* cited by examiner

*Primary Examiner* — Elvin G Enad
*Assistant Examiner* — Alexander Talpalatski
(74) *Attorney, Agent, or Firm* — C. G. Mersereau; Nikolai & Mersereau, P.A.

(57) ABSTRACT

A wireless earphone device capable of providing balanced stereo. The wireless headset includes a Bluetooth earphone device, an audio adaptor, and a stereo earphone device for giving balanced sounds on both left and right channels. When the Bluetooth earphone device and the stereo earphone device are connected with the audio adaptor respectively, an audio switching module of the Bluetooth earphone device determines to transmit stereo audio signal with first channel signal and second channel signal to the stereo earphone device through the audio adaptor. Otherwise, only one channel of the stereo audio signal is transmitted from the audio switching module to a mono speaker unit on the Bluetooth earphone device.

10 Claims, 6 Drawing Sheets

WIRELESS HEADSET DEVICE CAPABLE OF PROVIDING BALANCED STEREO AND METHOD THEREOF

CROSS REFERENCE TO RELATED APPLICATION

This patent application is claiming priority under 35 U.S.C. 120 as a continuation-in-part patent application of co-pending patent application Ser. No. 12/117,815, filed May 9, 2008.

BACKGROUND OF THE INVENTION

1. Field of the Invention

The present invention is related to a wireless headset, and more particular to a wireless headset device capable of providing balanced stereo and a method thereof 2. Description of Related Art Wireless communication technology is becoming more mature and convenient by the day, for example Bluetooth Communication is currently widely used for short range wireless communication technology applications; now consider in conjunction with mobile communication equipment functionality which is becoming more and more versatile, then it is easy to realize Bluetooth Technology are not only used for data synchronization, but are even more often used as a wireless transceiver agent between a wireless headset microphone and a mobile communication equipment (i.e., mobile phone). Especially consider that the current market has developed many brands of multi-functional mobile phone that can also listen to music, user can thus utilize single ear (single channel) hang-type Bluetooth hands-free headset, which can be used for in-coming Bluetooth mobile phone communication, and also can be used to listen to music coming from a Bluetooth mobile phone.

Established to encourage, promote, and support Bluetooth Technology development, the Bluetooth Special Interest Group (Bluetooth SIG) specified the Advanced Audio Distribution Profile (A2DP), which defines how high quality audio can be streamed from one device to another over a Bluetooth connection, so that a Bluetooth equipment user can use a Bluetooth headset to listen to high quality music, as long as both the user's mobile phone and the wireless headset support A2DP. This kind of Bluetooth equipment can supply users with stereo output, which surpasses conventional mobile phones that can only broadcast in mono.

However, the typical Bluetooth headset today consists of a single ear (single channel) hang-type headset, which by its physical nature has only one headset accessory for a single ear audio output, so even if the mobile phone and headset both support A2DP, the user will still not enjoy the full range of high audio quality music. Due to this limitation, the current market developed a headset that connects to both ears, and output the audio in both ears in a stereo headset device, such as the device disclosed by Republic of China Patent number M299999 "Duel Mode Headset Device", which aims to solve the limitation of single ear (single channel) Bluetooth headset by connecting an extra single ear headset via a wire to the original single ear Bluetooth headset, thus achieving duel ear audio output.

Although this method solves the limitation of single ear headset, but considering the solution: "The headset includes a first headset, a second headset, and a transmission line. The first headset includes a first housing; an interface module for receiving an audio signal; a signal processing module for separating the audio signal into a first channel signal and a second channel signal; an amplifying circuit for respectively amplifying the first channel signal and the second channel signal to generate a first amplified signal and a second amplified signal; and a first speaker for outputting audio according to the first amplified signal. The second headset includes a second housing; and a second speaker for outputting audio according to the second amplified signal. The transmission line is for transmitting the second amplified signal to the second headset;" the audio balance produced by this method from the audio channel output will be offset, because the first headset and second headset are made separately then tied together by a transmission line, which means the first amplified signal will arrive and be output by the first headset speaker first, while the second amplified signal will travel by the transmission line then arrive and be output by the second headset speaker with a delay. Furthermore, the amplifying circuit amplifies the first channel signal and the second channel signal separately via the signal processing module in the first headset, which mean there would be a further difference between the two audio output, such as one side would be louder and the other side would be more quiet, or one side would be more clear and the other side would have more noise, which result in inferior output audio quality when compared to single piece duel ear stereo headset, and would more prone to cause user with audio discomfort; further consider the second connected ear piece headset have to be used in cooperation with the original first Bluetooth headset, if the second headset is not connected to the first headset, it would serve no audio function, which further limits this type of stereo headset's functionality. Due to the analysis described above, regarding how to produce wireless headset device capable of producing balanced and high quality stereo sound, there is certainly room for improvement and the limitation should be further analyzed.

SUMMARY OF THE INVENTION

In order to improve upon the limitation described above and improve the product currently on the market place, the inventor proposes a simple wireless headset device capable of providing balanced stereo to a user, for wireless reception of audio signals from a first transceiver module of a mobile communication device. The wireless headset device includes a Bluetooth earphone device, an audio adaptor, and a stereo earphone device.

The Bluetooth earphone device includes: a communication module, including a second transceiver module for wirelessly transmitting and receiving a digital audio package between the mobile communication device and the Bluetooth earphone device, and an encoder/decoder module connected with the second transceiver module for decompressing the digital audio package received from the second transceiver module into a stereo signal, whereby the stereo signal may be decoded into a first channel signal and a second channel signal, and a mono speaker unit for outputting the first channel signal of the stereo signal, an audio connecting unit, for outputting the first channel signal and the second channel signal of the stereo signal; and an audio switching module, connected between the mono speaker unit and the audio connecting unit, for receiving the stereo signal decompressed by the encoder/decoder unit, and for sending only the first channel signal of the stereo signal to the mono speaker unit or sending the first channel signal and the second channel signal of the stereo signal to the audio connecting unit.

The stereo earphone device includes: an audio input unit for establishing communication with the Bluetooth earphone device and receiving the stereo signal; a first speaker unit for outputting the first channel signal of the stereo signal received by the audio input unit; and a second speaker unit for outputting the second channel signal of the stereo signal received by the audio input unit.

The audio adaptor includes: a receiving slot having a stereo connecting unit therein, wherein the receiving slot is used for receiving the Bluetooth earphone device, the stereo connecting unit is electronically connected with the audio connecting unit when the Bluetooth earphone is received in the receiving slot and is used for receiving the first channel signal and the second channel signal from the audio connecting unit; a first microphone for receiving a voice signal of the user when the Bluetooth earphone is received in the receiving slot; an echo cancellation unit, connected with the stereo connecting unit and the first microphone, used for depressing an echo resulted from the voice signal from the first microphone and the stereo signal from the stereo connecting unit;

and a stereo output unit connected with the echo cancellation unit, for outputting the first channel signal and the second channel signal without the echo to the stereo earphone device when electronically connected with the audio input unit.

DETAILED DESCRIPTION OF THE PREFERRED EMBODIMENTS

In order to further explain the present invention's object, so that reader can easier understand the present invention's technique, the below embodiments will be used in conjunction with figures to explain by example regarding the present invention.

Figure 1:
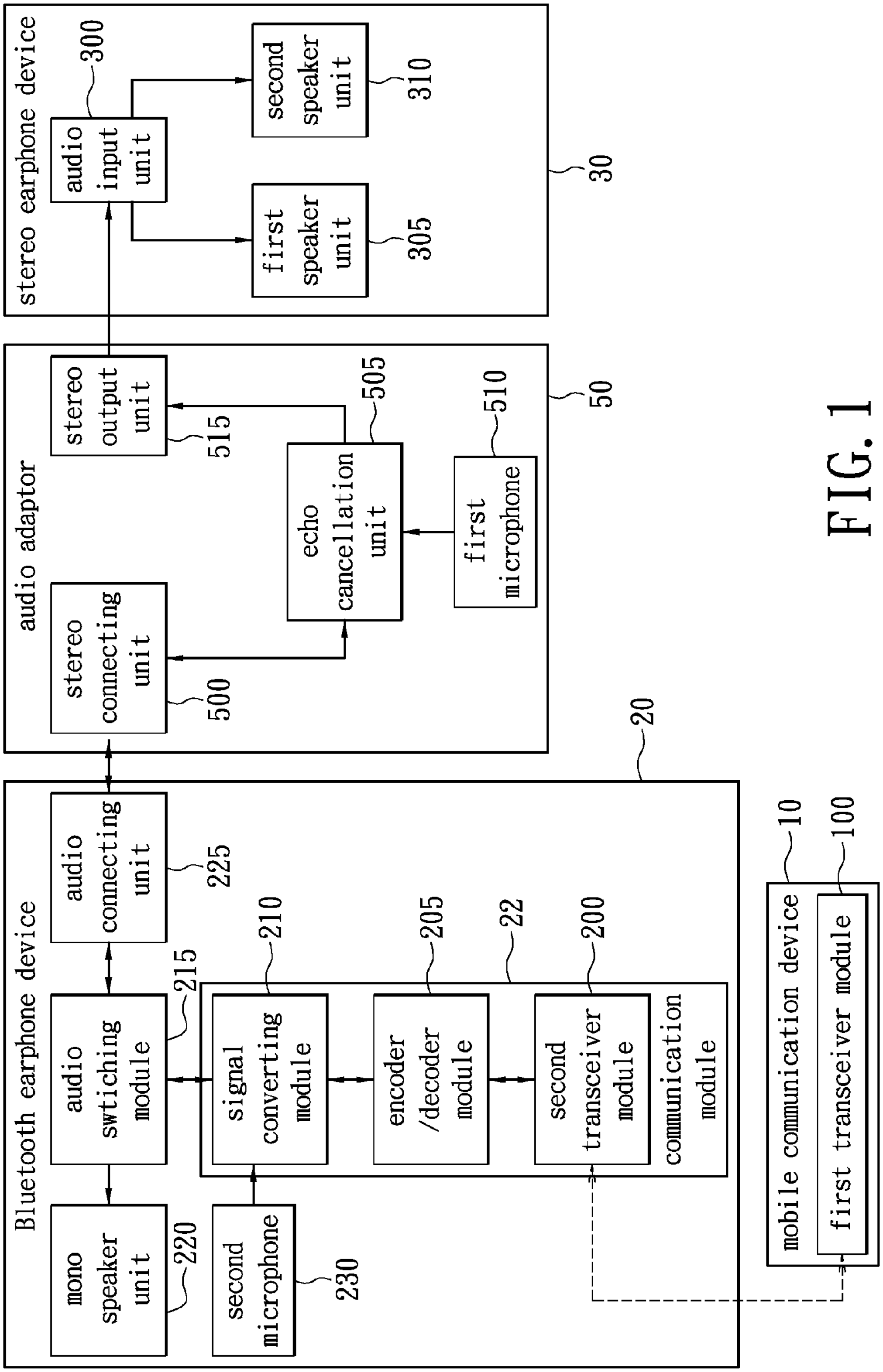
FIG. 1 shows an embodiment of a schematic diagram for a wireless headset device capable of providing balanced stereo according to the present invention.

FIG. 1 is an embodiment of a schematic diagram for a wireless headset device capable of providing balanced stereo according to the present invention: the Bluetooth earphone device 20 via wireless transmission technology (i.e. IEEE 802.15) receives audio signals from mobile communication device 10, and connects to stereo earphone device 30 through audio adaptor 50 in order to output the audio signals transmitted from the mobile communication device 10.

Bluetooth earphone device 20 includes a communication module 22, an audio switching module 215, a mono speaker unit 220, an audio connecting unit 225, and a second microphone 230. Communication module 22 further includes a second transceiver module 200 for transmitting and receiving audio signals, an encoder/decoder module 205 used to respectively encode (compress) the audio signal transmitted to the second transceiver module 200 and decode (decompress) the audio signal received from the second transceiver module 200, and a signal converting module 210 for converting the decoded digital audio signals into analog audio signals and converting analog signals received from second microphone 230 into digital signals. The analog audio signal produced by the communication module 22 may be sent to the audio switching module 215. The audio switching module 215 determines whether the audio signal should be sent to mono speaker unit 220 and output via the mono speaker unit 220 without stereo effect or to stereo earphone device 30 through audio adaptor 50 for stereo effect.

Bluetooth earphone device 20 via the second transceiver module 200 transmits and receives signals to/from first transceiver module 100 of mobile communication device 10, and thus establishes communication with the mobile communication device 10. Mobile communication device 10 may exemplarily be a mobile phone capable of playing music, songs, or the like.

The audio adaptor 50 includes a stereo connecting unit 500, an echo cancellation unit 505, a first microphone 510, and a stereo output unit 515. Stereo connecting unit 500 is used to be electronically connected with audio connecting unit 225 of the Bluetooth earphone device 20. Echo cancellation unit 505 is used to eliminate an echo resulted from receiving a voice signal from the first microphone 510 and audio signal transmitted from Bluetooth earphone device 20. Stereo output unit 515 connected with the echo cancellation unit 505 transmits the audio signal without echo to the stereo earphone device 30.

The stereo earphone device 30 includes an audio input unit 300, a first speaker unit 305, and a second speaker unit 310. The stereo earphone device 30 via audio input unit 300 establishes communication with the audio connecting unit 225 of the Bluetooth earphone device 20, thereby receiving audio signal output by the Bluetooth earphone device 20, and transmitting the audio signal to the first speaker unit 305 and the second speaker unit 310.

In the present embodiment, the second transceiver module 200 of the communication module 22 may receive an encoded digital audio package from mobile communication device 10, and send the package to the encoder/decoder module 205, so that the digital audio package can be decompressed back to a stereo audio signal including a first channel signal and a second channel signal.

The stereo audio signal is currently still digitized. Signal converting module 210 coverts the stereo audio signal into analog form and sends to audio switching module 215. Audio switching module 215 determines a transmission path for the stereo audio signal to mono speaker unit 220 or to audio adaptor 50 through audio connecting unit 225 based on whether audio adaptor 50 is connected with Bluetooth earphone device 20. When audio adaptor 50 is connected with Bluetooth earphone device 20 via stereo connecting unit 500 electronically connected with audio connecting unit 225, the audio switching module 215 switches the stereo audio signal including the first channel signal and the second channel signal received from communication module 22 to audio adaptor 50 via audio connecting unit 225. When audio connecting unit 225 not connected with stereo connecting unit 500, audio switching module 215 switches the stereo audio signal to mono speaker unit 220 for output. Mono speaker unit 220 is capable for output only one channel of audio signals, therefore when audio switching module 215 transmits stereo audio signal to mono speaker unit 220, only the first channel signal is transmitted to mono speaker unit 220 and output.

On the other hand, if audio switching unit 215 determines that the Bluetooth earphone device 20, through audio connecting unit 225, is connected to stereo connecting unit 500 of the audio adaptor 50, audio switching module 215 transmits both the first channel signal and the second channel signal to audio connecting unit 225, which may be further transmitted to stereo earphone device 30 electronically connected with audio adaptor 50.

When audio adaptor 50 is respectively electronically connected with Bluetooth earphone device 20 and stereo earphone device 30, voice signal of a user is received by first microphone 510 of the audio adaptor 50 instead of second microphone 230 of the Bluetooth earphone device 20. An echo may occur due to the voice signal and the stereo audio signal in the audio adaptor 50. Therefore, echo cancellation 505 may receive both the voice signal and the stereo audio signal and eliminate the echo before transmitting the stereo audio signal to stereo output unit 515 and the voice signal back to Bluetooth earphone device 20 through stereo connecting unit 500.

Stereo earphone device 30 via audio input unit 300 receive stereo audio signal including the first channel signal and the second channel signal send by the stereo output unit 515 of the audio adaptor 50, and respectively send the first channel signal and the second channel to the first speaker unit 305 and second speaker unit 310, so that user can directly utilize stereo earphone device 30 which posses dual (left and right) channel in order to listen to the full ranged and balanced stereo.

The second microphone 230 in the Bluetooth earphone device 20 is used for receiving external audio input, such as a user's voice signal, when the Bluetooth earphone device 20 is unconnected with the audio adaptor 50. The voice signal is sent to signal converting module 210 to be converted to a digital audio signal, and sent to encoder/decoder module 205 to be encoded as package data in turn, then through the second transceiver module 200 transmitted to the mobile communication device 10 of the intended receiver. Similarly, the voice signal received by the first microphone 510 when audio adaptor 50 is in connection with the Bluetooth earphone device 20 may also be sent to the communication module 22 through audio connecting unit 225 and audio switching module 215 to be processed into packet data, and transmitted wirelessly to the mobile communication device 10.

Figure 2:
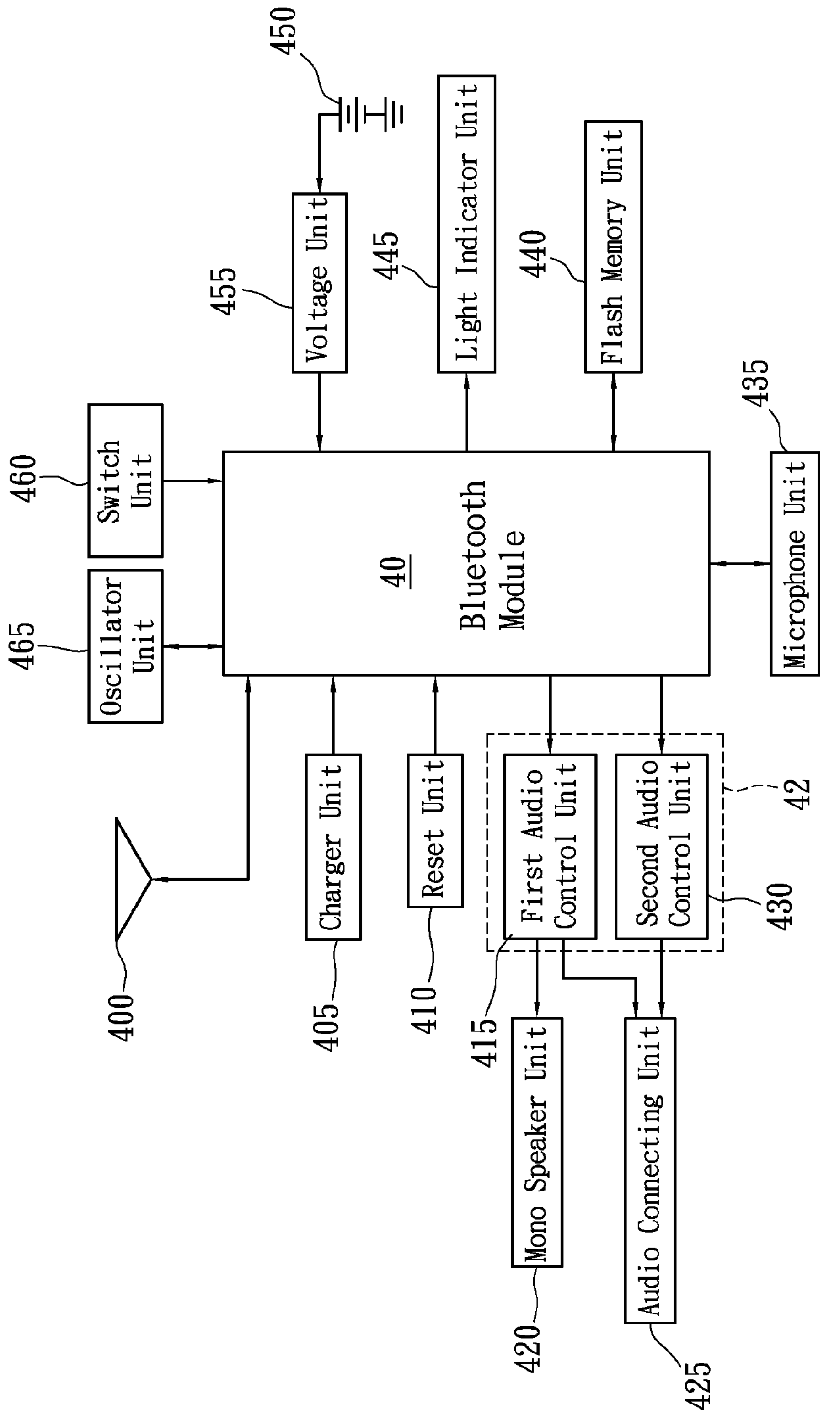
FIG. 2 shows another embodiment of a schematic diagram for a wireless headset device capable of providing balanced stereo according to the present invention.
Figure 3A:
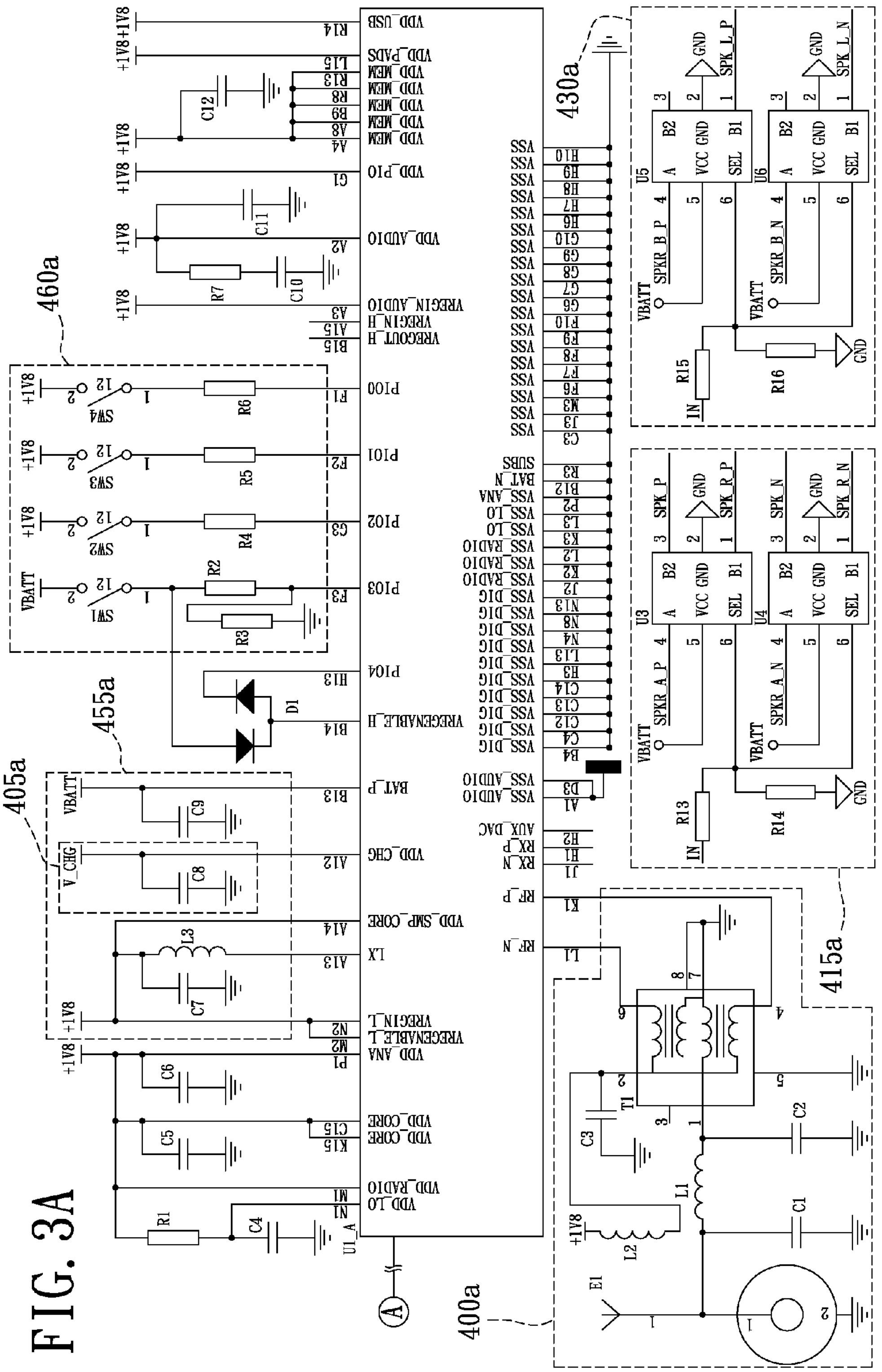
FIG. 3A and FIG. 3B shows an embodiment of a circuit diagram for a wireless headset device capable of providing balanced stereo according to the present invention.
Figure 3B:
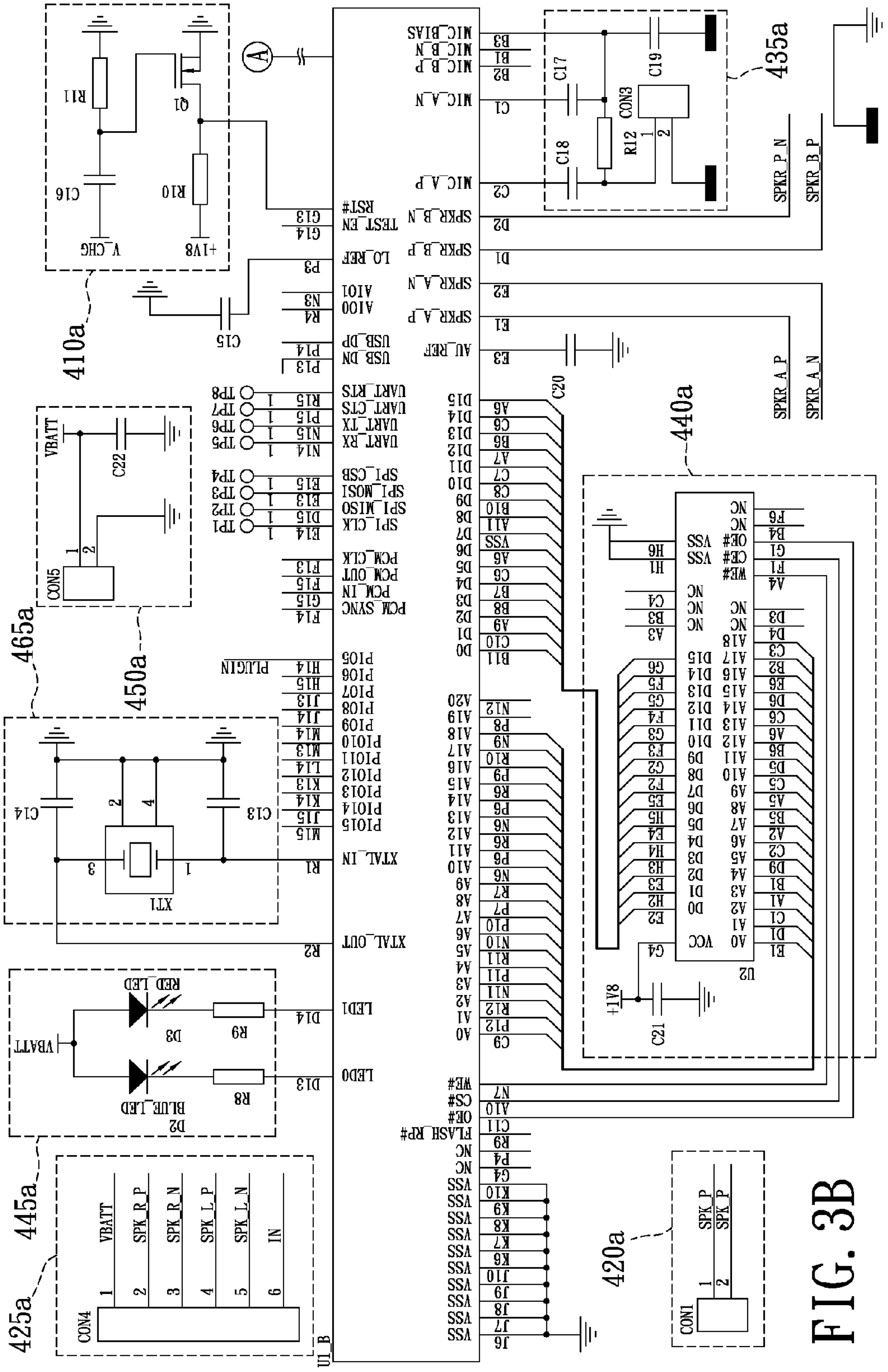

FIG. 2 is an embodiment of a schematic diagram for a Bluetooth earphone device according to the present invention, and FIG. 3A and FIG. 3B together is the present embodiment's circuit diagram for a Bluetooth earphone device according to the present invention, in order to avoid the circuit diagram appearing overly small and cause inconvenience in reading, so the present embodiment's circuit diagram will be split into two parts (U1_A and U1_B), and respective displayed in FIG. 3A and FIG. 3B, but in actuality please understand that the component modules belongs on the same circuit chip.

In the present embodiment, the Bluetooth earphone device 20 via Bluetooth technology achieves wireless transmitting and receiving functionality of wireless Bluetooth headset, which includes a Bluetooth module 40, charger unit 405, reset unit 410, switching module 42, mono speaker unit 420, audio connecting unit 425, microphone unit 435, flash memory unit 440, light indicator unit 445, battery unit 450, voltage unit 455, switch unit 460, and oscillator unit 465, wherein the switching module 42 further includes a first audio control unit 415 and a second audio control unit 430.

The headset through the antenna unit 400 of the Bluetooth module 40 receives a digital audio package and thus communicates with audio transceiver unit 10, and the Bluetooth module 40 decode the received digital audio package to a digital stereo signal (which includes a left channel signal and a right channel signal), and then convert the stereo signal into an analog stereo signal (still with a left channel signal and a right channel signal). The antenna unit 400's circuit diagram can be referenced as 400*a* of FIG. 3A (The below mentioned circuit diagram please reference FIGS. 3A and 3B).

The second audio control unit 430 of the switching module 42 sends the left channel signal to the audio connecting unit 425; and the first audio control unit 415 via multiplexer controls whether to send the right channel signal to the mono speaker unit 420 or to the audio connecting unit 425. If the wireless Bluetooth headset is not connected to stereo earphone device 30, then first audio control unit 415 will send the right channel signal to the mono speaker unit 420 for output; but on the other hand if the two devices are connected, then the first audio control unit 415 will send the right channel signal to audio connecting unit 425, to complement the left channel signal that was also send to the audio connecting unit 425, and the audio connecting unit 425 will simultaneously switch the dual channel signal to the externally connected stereo earphone device 30, thus the right channel signal will be output from the right side speaker of the stereo earphone device 30 (such as first speaker unit 305), and the left channel signal will be output from the left side speaker of the stereo earphone device 30 (such as second speaker unit 310). The circuit diagram of schematic diagram component 415 to 430 can respectively be reference in component 415*a* to 430*a* of FIGS. 3A and 3B.

Microphone unit 435 is the result of second microphone 230's need of a biasing circuit and audio signal, and the associated circuit diagram can be referenced in 435*a* of FIG. 3B. Charger unit 405 provide voltage for Bluetooth module 40, for when the battery is charging, please reference 405*a* of FIG. 3A; reset unit 410 is for resetting the Bluetooth module 40 while charging, please reference 410*a* of FIG. 3B. Flash memory unit 440 is for storing the software of Bluetooth module 40, please reference 440*a* of FIG. 3B; there is also the light indicator unit 445 which control the LED to indicate various status regarding the wireless Bluetooth headset, please reference 445*a* of FIG. 3B; battery unit 450 supply the overall required battery for the wireless Bluetooth Headset while it is functioning, please reference 450*a* of FIG. 3B; voltage unit 455 uses the voltage supplied by battery unit 450, and provide the Bluetooth module 40 with the necessary operating voltage, please reference 455*a* of FIG. 3A.

Furthermore, there is the switch unit 460 and the oscillator unit 465, wherein the switch unit 460 provides control for the wireless Bluetooth headset that require switching or adjustment, such as Power on/off, device pairing, volume adjustment, etc. Please reference 460*a* of FIG. 3A; the oscillator unit 465 provides the clock needed by the Bluetooth module 40, please reference 465*a* of FIG. 3B.

Figure 4:
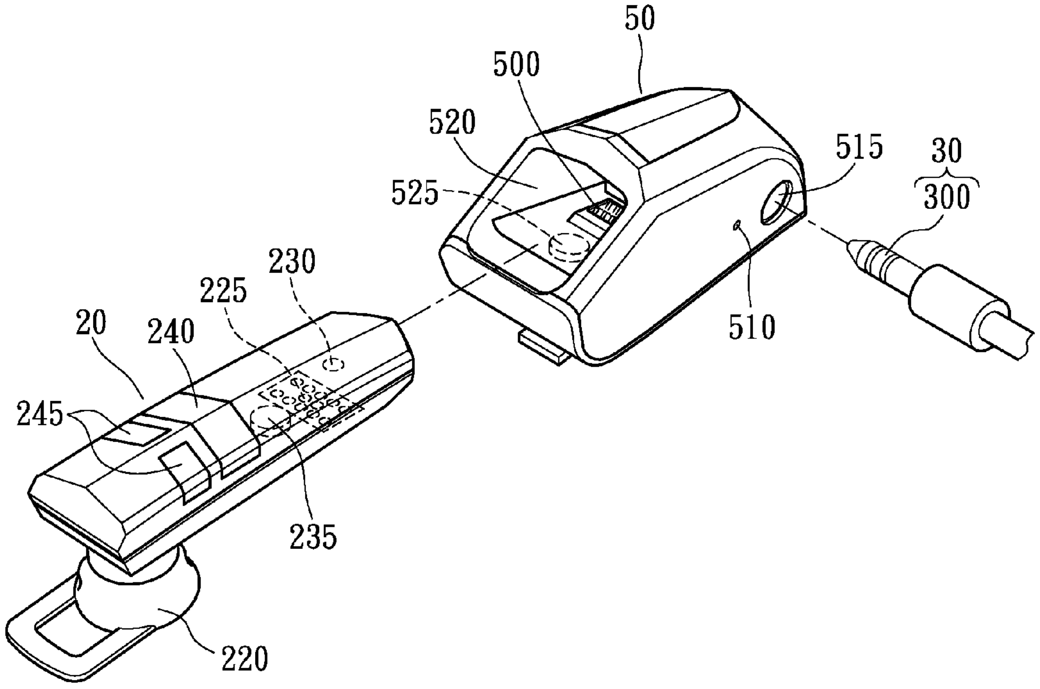
FIG. 4 and FIG. 5 shows an embodiment of a perspective illustration for a wireless headset device capable of providing balanced stereo according to the present invention.

FIG. 4 shows an embodiment of a perspective drawing for a wireless headset device corresponding to the wireless headset device in FIG. 1 according to the present invention. Please notice that similar element may refer to similar numbers in FIGS. 1 and 4. The wireless headset device in FIG. 4 includes a Bluetooth earphone device 20, an audio adaptor 50, and a stereo earphone device 30. One side of the Bluetooth earphone device 20 has a mono speaker unit 220 for a user listening to a coming call or music from a mobile communication device (now shown in FIG. 4), an audio connecting unit 225 implemented in the form of a plurality of metallic dots for transmitting data and signals, and a second microphone 230 for receiving the user's voice signal in order to answering phone calls. On the opposite side of the Bluetooth earphone device 20 includes a power button 240 for turning on/off the Bluetooth earphone device 20, and volume buttons 245 for controlling volume of sound output from the second microphone 220.

Except for the stereo connecting unit 500, the first microphone 510 for receiving voice signal, and the stereo output unit 515 for connecting the audio input unit 300 of stereo earphone device 30, the audio adaptor 50 further includes a receiving slot 520 which is used for receiving the Bluetooth earphone device 20. The stereo connecting unit 500, in the form of a plurality of pins corresponding to the above-mentioned metallic dots, is set in the receiving slot 520. Therefore, when the Bluetooth earphone device 20 is inserted into the receiving slot 520, the audio connecting unit 225 may electronically connect to the stereo connecting unit 500 via physically connection between the plurality of pins and metallic dots as shown in FIG. 5.

Please refer to FIG. 4 again, a magnet 235 is embedded in the Bluetooth earphone device 20 while the audio adaptor 50 is also embedded with a magnetic unit 525 near the surface of the receiving slot 520. When the Bluetooth earphone device 20 approaches the opening of the receiving slot 520, the magnet 235 and the magnetic unit 525 advance the Bluetooth earphone device 20 to be swiftly and accurately inserted into the receiving slot 520 and cause the audio connecting unit 225 electronically connect with the stereo connecting unit 500 by attracting each other. Therefore, as shown in FIG. 5, when the Bluetooth earphone device 20 is received in the receiving slot 520 of the audio adaptor 50, the magnet 235 may be in positional correspondence with the magnetic unit 525, as well as the plurality of pins may contact with the plurality of metallic dots for establishing connection between the Bluetooth earphone device 20 and the audio adaptor 50.

Figure 5:
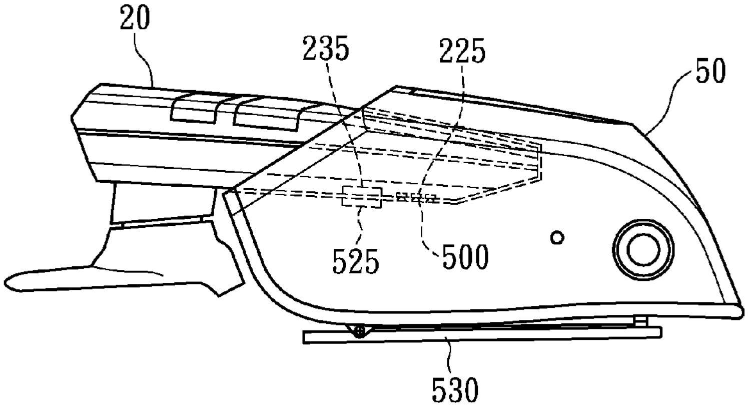

Furthermore, as shown in FIG. 5, a clip 530 may be mounted at one surface of the audio adaptor 50, so that the audio adaptor 50 may be clipped on the user's pocket or tie to fasten the audio adaptor 50.

Figure 6:
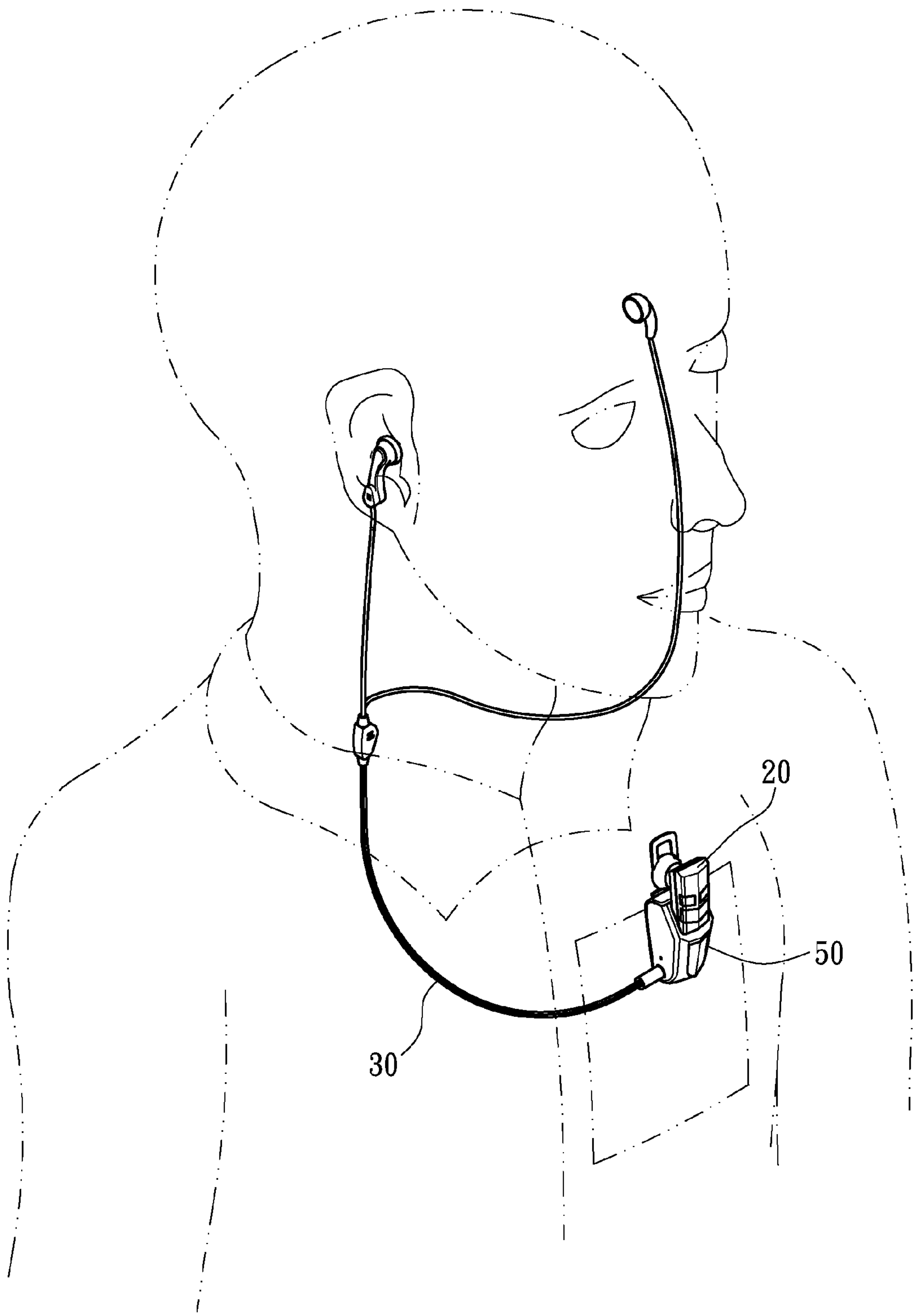
FIG. 6 shows another embodiment of a structure connection representation diagram for a wireless headset device capable of providing balanced stereo according to the present invention.

Please refer to FIG. 6, when the Bluetooth earphone device 20 is connected with the audio adaptor 50 by inserting into the audio adaptor 50, and the stereo earphone device 30 is connected with the audio adaptor 50 by inserting audio input unit 300 (i.e. a 3.5 mm TRS jack) into the stereo output unit 515 (i.e. a 3.5 mm TRS socket), the user may use the stereo earphone device 30 to listen to stereo audio signal to enjoy the stereo sound effect. Meanwhile, the user may fasten the audio adaptor 50 on the pocket via the clip and enjoy hands-free function.

As per the detailed descriptions and embodiments described above, a simple and effective method has been disclosed, which allows a wireless headset to output stereo sound effect, and the stereo signal produced according to the present invention's technique, will not cause right and left channel to have unbalanced sound quality or uneven volume, and can allow for user desire to be plugged in (for stereo sound) or taken off (for mono sound), which greatly increase the usability of single ear (single channel) hang type headset's usability. Besides, user of the wireless headset device may still be hands free while using the headset device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless earphone device capable of providing balanced stereo to a user, for wireless reception of audio signals from a first transceiver module of a mobile communication device, comprises:

- a Bluetooth earphone device comprising:
  - a communication module, which comprises:
    - a second transceiver module, for wirelessly transmitting and receiving a digital audio package between the mobile communication device and the Bluetooth earphone device, and
    - an encoder/decoder module, connected with the second transceiver module, for decompressing the digital audio package received from the second transceiver module into a stereo signal, whereby the stereo signal may be decoded into a first channel signal and a second channel signal; and
  - a mono speaker unit, for outputting the first channel signal of the stereo signal;
  - an audio connecting unit, for outputting the first channel signal and the second channel signal of the stereo signal; and
  - an audio switching module, connected between the mono speaker unit and the audio connecting unit, for receiving the stereo signal decompressed by the encoder/decoder unit, and for sending only the first channel signal of the stereo signal to the mono speaker unit or sending the first channel signal and the second channel signal of the stereo signal to the audio connecting unit;
- a stereo earphone device, comprising:
  - an audio input unit, establishing communication with the Bluetooth earphone device and receiving the stereo signal;
  - a first speaker unit, outputting the first channel signal of the stereo signal received by the audio input unit; and
  - a second speaker unit, outputting the second channel signal of the stereo signal received by the audio input unit;
- an audio adaptor, comprising:
  - a receiving slot having a stereo connecting unit therein, wherein the receiving slot is used for receiving the Bluetooth earphone device, the stereo connecting unit is electronically connected with the audio connecting unit when the Bluetooth earphone is received in the receiving slot and is used for receiving the first channel signal and the second channel signal from the audio connecting unit;
  - a first microphone for receiving a voice signal of the user when the Bluetooth earphone is received in the receiving slot;
  - an echo cancellation unit, connected with the stereo connecting unit and the first microphone, used for depressing an echo resulted from the voice signal from the first microphone and the stereo signal from the stereo connecting unit; and
  - a stereo output unit connected with the echo cancellation unit, for outputting the first channel signal and the second channel signal without the echo to the stereo earphone device when electronically connected with the audio input unit.

2. The wireless earphone device as claimed in claim 1, wherein the switching module comprises:

- a first audio control unit, which depending on whether the audio connecting unit is connected with the stereo connecting unit or not, causes the first channel signal to be outputted by the audio output signal or by the mono speaker unit; and a second audio control unit, for causing the second channel signal to be outputted by the audio output when the audio connecting unit is connected with the stereo connecting unit.

3. The wireless earphone device as claimed in claim 1, wherein the communication module comprises:

a signal converting module, connected between the encoder/decoder module and the audio switching module, for converting the stereo signal decoded by the encoder/decoder module from digital to analog.

4. The wireless earphone device as claimed in claim 1, wherein the Bluetooth earphone device further comprises:

a second microphone, coupled to the signal converting module, for receiving the voice signal of the user when the Bluetooth earphone device is not received in the receiving slot, and sending the voice signal to the signal converting module to be digitized.

5. The Bluetooth earphone device as claimed in claim 4, wherein the encoder/decoder module receives the digital signal and encodes the voice signal to a new digital audio package, then through the second transceiver module the new digital audio package is transmitted to the mobile communication device.

6. The Bluetooth earphone device as claimed in claim 1, wherein the echo cancellation unit transmits the voice signal without the echo to the Bluetooth earphone device via the stereo connecting unit, and the audio switching module transmits the voice signal through the audio connecting unit to the signal converting module to be digitized.

7. The wireless earphone device as claimed in claim 6, wherein the encoder/decoder module receives the digital signal and encodes the voice signal to a new digital audio package, then through the second transceiver module the new digital audio package is transmitted to the mobile communication device.

8. The wireless earphone device as claimed in claim 1, wherein the stereo output unit is a TRS socket, and the audio input unit is a TRS jack.

9. The Bluetooth earphone device as claimed in claim 1, wherein the audio adaptor further comprises a magnetic unit approaching the surface of the receiving slot, and the Bluetooth earphone device comprises a magnet embedded inside the Bluetooth earphone device, wherein the Bluetooth earphone device is received into the receiving slot via the attraction between the magnetic unit and the magnet.

10. The Bluetooth earphone device as claimed in claim 1, wherein the audio adaptor further comprises:

a clip mounted on a surface of the audio adaptor, allowing the audio adaptor to be fastened on the user.

* * * * *